United States Patent [19]
Huff et al.

[11] Patent Number: 5,164,558
[45] Date of Patent: Nov. 17, 1992

[54] MICROMACHINED THRESHOLD PRESSURE SWITCH AND METHOD OF MANUFACTURE

[75] Inventors: Michael A. Huff, Medford; Martin A. Schmidt, Reading, both of Mass.

[73] Assignee: Massachusetts Institute of Technology, Cambridge, Mass.

[21] Appl. No.: 726,073

[22] Filed: Jul. 5, 1991

[51] Int. Cl.$^5$ ............................................. H01H 35/40
[52] U.S. Cl. ................................. 200/83 R; 200/512; 29/622
[58] Field of Search ............. 29/622; 200/83 R, 83 B, 200/83 N, 512

[56] References Cited

U.S. PATENT DOCUMENTS

| | | | |
|---|---|---|---|
| 2,798,130 | 7/1957 | Cox | 200/83 N |
| 4,744,863 | 5/1988 | Guckel et al. | 156/653 |
| 4,853,669 | 8/1989 | Guckel et al. | 338/4 |

FOREIGN PATENT DOCUMENTS

WO91/02169 2/1991 PCT Int'l Appl. .

OTHER PUBLICATIONS

"A Threshold Pressure Switch Utilizing Plastic Deformation of Silicon", by M. A. Huff et al., presented at *Transducers '91*, San Francisco, Calif., Jun. 23-30, pp. 1-4.
"A Micromachined Threshold Pressure Switch", by M. A. Huff et al., presented at *Transducers '91*, San Francisco, Calif., Jun. 23-30, 1991, pp. 1-2.
"Plastic Deformation of Single-Crystal Silicon Layers Bonded Over Etched Cavities", by M. A. Huff et al., presented at *Transducers '91*, San Francisco, Calif., Jun. 23-30, 1991, pp. 1-3.
"A Pressure-Balanced Electrostatically-Actuated Microvalve", by M. A. Huff et al., presented at 1990 IEEE *Solid State Sensor and Actuator* Workshop, Hilton Head, S.C., Jun. 4-7, 1990, pp. 123-127.
"A Monolithic Silicon Switch System for Tire Pressure Measurement", by S. C. Terry et al., The 4th International Conference on Solid-State Sensors and Actuators, *Transducers '87*, Tokyo, Japan, Jun. 2-5, 1987, Digest of Technical Papers, pp. 76-78.
"The Development of Two Simple Tire Warning Devices", by Hiroaki Nishimura, Society of Automotive Engineers, Publication No. 840067, pp. 1-5, 1984.
"Development of Digital Tire Pressure Display Device", by H. Nishimura et al., Society of Automotive Engineers, Publication No. 851237, 1985, pp. 1-6.

*Primary Examiner*—P. W. Echols
*Attorney, Agent, or Firm*—Hamilton, Brook, Smith & Reynolds

[57] ABSTRACT

A pressure activated threshold switch has two electrodes separated by a small distance across a cavity. One of the electrodes is made of a mechanically compliant material. As a uniform pressure is applied to the mechanically compliant electrode, a threshold is reached at which the electrode buckles under the applied load and makes contact with the second electrode thereby closing the switch. The switch exhibits mechanical hysteresis by subsequently opening under a lower applied load. The pressure threshold switch is fabricated using wafer to wafer silicon bonding along with conventional integrated fabrication steps. The techniques of integrated circuit technologies enable dimensional control to be very good and hence activation pressures are tightly controlled. The fabrication method exploits properties of wafer to wafer silicon bonding, such as residual pressure inside sealed cavities and plastic deformation of silicon. The buckling load or threshold pressure at which the switch closes is easily tailored to specific applications. Potential applications include threshold pressure sensors for indicating when automotive tires need inflation, tank pressure monitors in air and gas compressors, switches for keyboard pads, weight detectors and robotic tactile sensor arrays.

16 Claims, 5 Drawing Sheets

MICROMACHINED THRESHOLD PRESSURE SWITCH AND METHOD OF MANUFACTURE

BACKGROUND OF THE INVENTION

In the electromechanical arts, a switch is a device used for effecting the completion and interruption of a circuit. See "The Way Things Work: an Illustrated Encyclopedia of Technology", volume 1 published by Simon and Schuster, 1967, pages 96-97. There are various types of switches and switch configurations for various applications.

One type of switch is a pressure switch. In general, a pressure switch has an upper electrode and a lower electrode spaced from each other. Under a predetermined (threshold) load, the two electrodes are brought together and make contact. The switch has two positions (states), open and closed. Typically the switch is open when an applied load is less than the threshold pressure such that the two electrodes are spaced apart from each other. The switch is in its closed state when a load greater than the threshold pressure is applied to the switch causing the two electrodes to make contact with each other.

SUMMARY OF THE INVENTION

The present invention provides a threshold pressure switch that is formed by silicon micromachining and wafer to wafer bonding techniques. In particular, the present invention switch fabrication method takes advantage of (i) the residual pressure from gases trapped in a cavity during a wafer to wafer bonding, and (ii) the plastic deformation of silicon.

In a preferred embodiment the pressure switch is of the type having a first electrode spaced from a second electrode. The first electrode moves toward and contacts the second electrode upon application of a threshold pressure to the switch. Formation of the first electrode spaced from the second electrode is by (a) trapping gas in an enclosed cavity formed between two working layers, and (b) expanding the gas to generate pressure sufficient to bloat (radially outward from the cavity) at least one of the working layers. The bloated working layer serves as the first electrode and the other working layer across the cavity from the bloated working layer serves as the second electrode.

The device in its preferred embodiment has a permanently hemispherically-shaped top electrode separated from the bottom electrode. The geometry of the top electrode allows the designer to predict the threshold pressure of the switch, that is, the pressure at which the top electrode collapses making contact with the bottom electrode thereby closing the switch. Additionally, the geometry of the top electrode allows the exploitation of an inherent mechanical characteristic of hemispherical domes under pressure loading, namely mechanical hysteresis.

The top electrode collapses under the action of a uniform pressure loading of sufficient magnitude. The hemispherical mode shape of the top electrode is stable for uniform pressure loading below the threshold level. However, as the loading increases this hemispherical mode shape is no longer stable and the structure changes its mode shape to a more stable configuration under the increased load. The stable mode shape adopted by the structure will be termed a collapsed mode shape because the center of the hemispherical dome will have gone from a position of maximum height to a position of minimum height. This mechanical action results in the top electrode contacting the bottom electrode, thereby closing the switch. It should be noted that the collapsing of the top electrode is not destructive to that mechanical element. The collapsing of the top electrode is a non-linear process, but the local deformations are within the linear elastic region of the material.

Mechanical hysteresis as it applies to the operation of the present invention switch means that the pressure at which the switch closes is higher than the pressure at which the switch subsequently opens. Therefore, as a pressure is applied to the top electrode, the switch remains open until the threshold pressure is reached. At this point, the top electrode collapses and the switch closes and remains closed for higher pressures. As the applied pressure is reduced, the top electrode remains collapsed and the switch closed until at some significantly reduced pressure the top electrode pops back to its original hemispherical shape. The mechanical hysteresis is due to the reduced mechanical restoring force of a collapsed hemispherical dome compared to the uncollapsed structure.

Preferably, the bloated working layer is single crystal silicon.

In accordance with one aspect of the present invention the step of trapping gas in the cavity is accomplished as follows. A cavity is formed in a first silicon layer through the upper surface of the silicon layer such that the cavity has an opening at the upper surface. A second silicon layer is attached to the upper surface of the first silicon layer such that a portion of the second silicon layer covers the cavity opening and in turn traps gas in the cavity. Preferably the second silicon layer is attached to the first silicon layer by silicon wafer bonding techniques. Other techniques for securing the two layers together are suitable as long as the strength of said structure prevents the layers from separating during fabrication of the device, particularly during the plastic deformation of one of the layers.

According to another aspect of the present invention, the step of expanding the gas trapped in the cavity includes heating the gas above a temperature at which the bloated working layer plastically deforms.

Accordingly, one of the preferred embodiments of the present invention provides an upper electrode by plastically deforming a portion of a first working layer covering a cavity formed in another working layer which serves as the lower electrode. The pressure switch changes from an open state to a closed state when a pressure sufficient to collapse the upper electrode to the lower electrode spaced across the cavity is applied to the switch.

In another embodiment, the bloated working layer that forms the top electrode is not necessarily plastically deformed. Instead, the trapped gas within the sealed cavity is heated causing the top electrode working layer to expand upward and then some layer of material is deposited onto the surface of the now bloated working layer locking in the shape of the bloated working layer. The shape is retained upon the cooling of the structure. Generally, the deposited layer covers the bloated working layer and provides the mechanical force necessary to maintain the shape of the working layer.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE PREFERRED EMBODIMENT

Figure 1A:
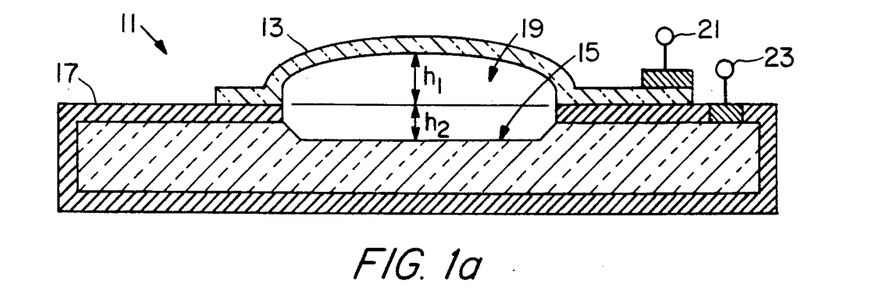
FIGS. 1a and 1b are a cross section and plan view respectively of a pressure switch embodying the present invention, the cross section being taken along the line I—I in FIG. 1b.
Figure 1B:
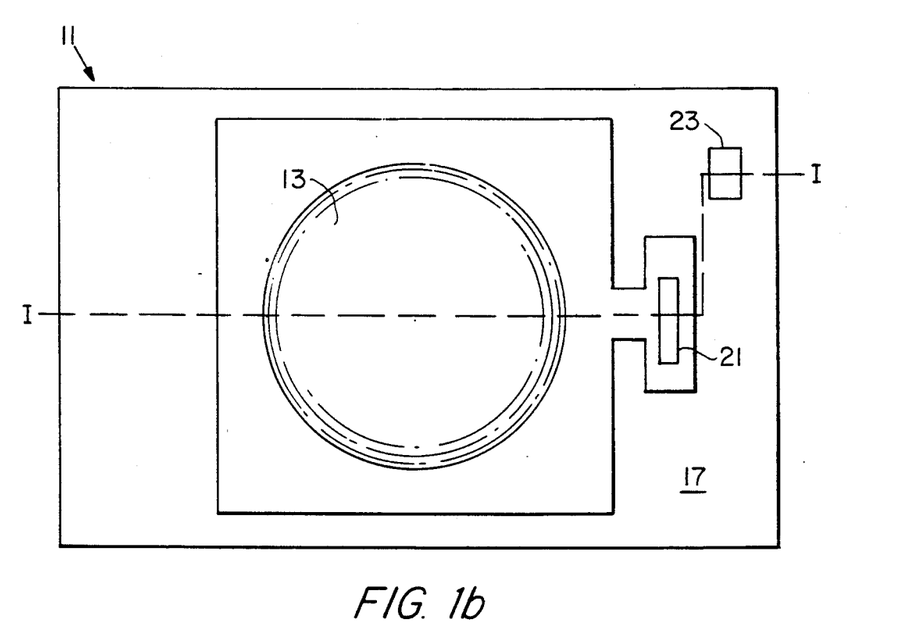

A schematic diagram of a threshold pressure switch 11 embodying the present invention is shown in FIGS. 1a and 1b, both in cross-section and plan view respectively. A hemispherically-shaped, preferably silicon, membrane 13 forms the top electrode of switch 11. The dimensions of this membrane 13 are designed such that the membrane will collapse under a pre-determined loading (threshold) pressure. If the thickness of the membrane 13 is sufficiently small, the threshold pressure can be quite small, e.g., less than about 1 atm as made clearer later.

The top electrode (membrane 13) is spaced from the bottom electrode 15 across a cavity 19. Separation of the electrodes 13, 15 is maintained by the mechanical restoring force due to the mechanical rigidity of the hemispherically shaped top electrode 13 and the internal pressure of inert gases trapped within the sealed cavity between the electrodes. The separation is maintained until the applied pressure force on the top surface of the top electrode 13 is sufficient to cause the top electrode 13 to collapse.

The bottom electrode 15 is also preferably made of a layer of silicon, but is much thicker, about 0.5 mm. The layers of silicon for both top and bottom electrodes 13, 15 are doped heavily to ensure minimal resistive losses in the layers. Outside the switch contact area, the two silicon layers are separated from each other by a layer of insulating material 17, for example silicon dioxide.

Figure 2:
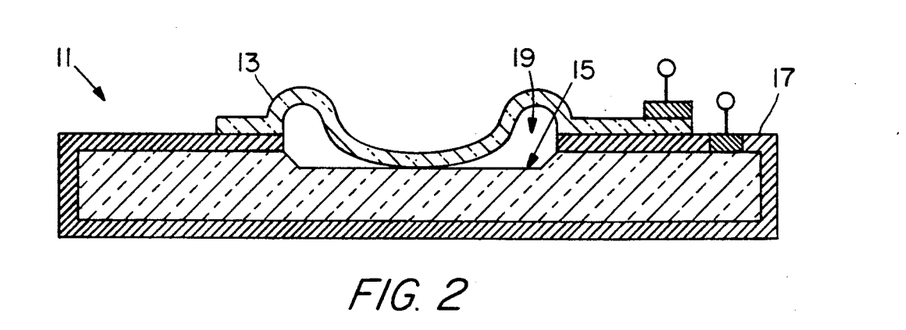
FIG. 2 is the cross section of the pressure switch of FIG 1a in a closed position.

Pressure switch 11 is a two terminal switch which is normally in an open state without pressure loading. As shown in FIG. 1, terminal 21 is connected to top electrode 13, and terminal 23 is connected to bottom electrode 15, electrically isolated from top electrode 13. As pressure loading increases, a threshold is reached where the hemispherical membrane 13 collapses (i.e., deflects so as to make contact with bottom electrode 15) as shown in FIG. 2. In turn, with the membrane (top electrode) 13 making contact with the bottom electrode 15, switch 11 closes (i.e., is in its closed state). The output signal through terminals 21, 23 is a significant change in resistance, from infinite impedance when loaded below the threshold pressure, to near zero impedance when loaded at or above the threshold pressure.

The method of fabrication of the pressure switch of the present invention provides features and advantages heretofore unattained. As mentioned above, both the top and bottom electrodes 13, 15 are preferably made of respective layers of silicon. The two layers of silicon are joined using a technique called silicon wafer to wafer bonding which results in a bonded composite structure having near single crystal strength. Generally, such a bond is strong enough to allow plastic deformation without the two layers coming apart.

The fabrication of the switch relies on two fundamental properties in silicon wafer to wafer bonding. The first is that if two wafers are bonded together wherein one of the wafers has a cavity etched into it prior to bonding, a residual pressure exists inside this cavity and is equal to 0.8 atm if the bonding is done in air. Presumably, as two wafers are bonded, the air in the cavity is trapped. During the high temperature phase of the bonding, the air can not escape before the cavity is permanently sealed. Additionally, during a subsequent high temperature anneal, the oxygen content of air, about 20%, reacts with the exposed silicon sidewalls forming a thin layer of silicon dioxide. The inert gases in air, notably nitrogen and argon, remain in the cavity leading to the residual gas pressure measured at about 0.8 atm.

The second property relates to the deformation of silicon. By exposing two bonded wafers that have a cavity within the composite structure to a suitably high temperature (i.e., yield temperature of silicon) environment, one can deform the silicon. This is due to (i) the expansion of the residual gases within the cavity as a result of heating from the high temperature environment, and (ii) the reduced yield and flow stress of silicon at such elevated temperatures. The effect is most noticeable when one of the wafers is etched back to a relatively thin layer, less than 10 µm for a 5 mm radius cavity, prior to high temperature exposure. Further the expanding residual gases provide the loading to deform (i.e., bloat radially outward from the cavity) the silicon layer, and this layer has a yield and flow stress less than the stress caused by the expanding gases at the appropriately selected elevated temperature. The threshold temperature for the onset of plastic deformation of silicon is above about 600° C. depending on surrounding conditions.

The method of fabrication of the present invention pressure switch exploits the residual pressure inside the sealed cavities and the deformation (and in particular, plastic deformation) of silicon in order to realize the structure shown in FIG. 1. These two features are considerations in another patent application, entitled "Method of Making a Microvalve", U.S. patent application Ser. No. 07/566,997, filed Aug. 13, 1990 and assigned to the assignee of the present invention and Bosch of the Federal Republic of Germany. A detailed fabrication sequence of the present invention follows, preceded by a discussion of the mechanical behavior of the pressure switch 11.

The mechanical behavior of the pressure switch 11 is generally characterized by (i) its nominally spherically-shaped structure, and (ii) its collapsing and hysteresis operation by design. In particular top electrode 13 is approximately hemispherically shaped (or at least a portion of a hemisphere). Thus the theory of elastic stability of spherical shells can be applied in determining the threshold pressure for collapsing.

As to the fabrication and design of the present invention switch, two complications must be addressed as follows.

First, the structure must be designed so as to withstand the pressure loading from the expansion of gases in cavity 19 during heating. That is, the structure must be able to survive the forces placed on it due to the expanding gas within the cavity 19 before the silicon begins to plastically deform. Second, for a pressure switch sensing pressure above 1 atm, the resultantly deformed structure must be able to withstand atmospheric or greater pressure static loading, ensuring that the top electrode 13 is not initially collapsed and contacting bottom electrode 15. For alternative switches of the present invention, such as a vacuum pressure switch, the top electrode 13 will be collapsed under atmospheric pressure but will pop back out to a bloated shape at some reduced pressure in a vacuum chamber.

Applicants have found that circular cavities with a radius of 1.8 mm, and a top electrode 13 layer of silicon 8 $\mu$m thick, will fracture at 600° C. if the cavity is much deeper than 10 $\mu$m. In such cases, the expanding gases inside the sealed cavity load the top electrode 13 layer of silicon beyond its yield point resulting in failure. Thus to determine the dimensions of the cavity such that the switch structure is likely to withstand the pressure forces, the ideal gas law in conjunction with simple mechanics are applied as follows.

From the ideal gas law, the pressure inside a cavity as a result of heating is:

$$P_2 = \frac{T_2}{T_1} P_1 \frac{V_1}{V_2} = \frac{T_2}{T_1} P_1 \frac{V_1}{V_1 + \Delta V}, \quad \text{Equation 1}$$

where $T_1$ and $T_2$ are the initial (room temperature) and final (maximum process temperature) temperatures, respectively;

$P_1$ and $P_2$ are the initial and final pressures, respectively; and $V_1$ and $V_2$ are the initial and final volumes, respectively.

The change in volume, $\Delta V$ is given by:

$$\Delta V = \frac{\pi}{6} h_1 (3a^2 + h_1^2), \quad \text{Equation 2}$$

where $h_1$ is the height of the top electrode 13 with respect to the plane in which top and bottom electrode 13, 15 layers are bonded together, and a is the radius or top electrode 13 assumed to be spherically shaped. Also, the equation for large deflection of the uniformly loaded circular top electrode is given by:

$$h_1 = .662a \left( \frac{qa}{Et} \right)^{1/3} \quad \text{Equation 3}$$

where $h_1$ is deflection of the top electrode 13;
a is the plate radius;
E is Young's modulus;
t is the thickness of the top electrode 13; and
q is the differential pressure loading across the top electrode causing the deflection and is given by:

$$q = P_2 - P_1 = \quad \text{Equation 4}$$

-continued $$\frac{T_2}{T_1} P_1 \frac{V_1}{V_2} - P_1 = \frac{T_2}{T_1} P_1 \frac{V_1}{V_1 + \Delta V} - P_1,$$

where $P_1 = P_{atm}$ (atmospheric pressure).

The maximum allowable deflection of the top electrode layer is then estimated by calculating the maximum stress in a uniformly-loaded circular plate and comparing this result to the known yield point for silicon at the appropriate temperature. The maximum stress in a uniformly loaded circular plate undergoing large deflections is given by:

$$\sigma_{max} = .423 \left( \frac{Eq^2 a^2}{t^2} \right)^{1/3}. \quad \text{Equation 5}$$

where
E is Young's modulus;
a is the radius of the plate;
t is the thickness; and
q is the differential pressure loading across the plate.

Combining Equation 3 and 5 and simplifying, the following expression for strain, $\epsilon$, can be written:

$$\epsilon = \frac{\sigma}{E} = 0.97 \left( \frac{h_1}{a} \right)^2; \quad \text{Equation 6}$$

where $\sigma$ is the maximum stress, E is Young's modulus, $h_1$ is the deflection, and a is the plate radius. Assuming a maximum strain of 0.1% before fracture and setting Equation 6 equal to 0.001, it is found that:

$$h_1 \leq 0.03a; \quad \text{Equation 7}$$

to prevent fracture.

Another design problem for present invention pressure switches desired to operate above 1 atm is the static collapsing (i.e. closure) of the top electrode 13 due to atmospheric loading. Since the effective volume of the cavity has swelled due to the plastically deformed top electrode layer 13, the residual pressure inside the cavity has been reduced. In turn, with the cavity pressure much reduced, the top electrode 13 layer may collapse under atmospheric loading alone. For example, a 0.5 mm radius circular membrane having a thickness of 3 $\mu$m and a cavity depth of about 3 $\mu$m, has been found to collapse under atmospheric loading.

Estimating worst case, Applicants assume that the pressure inside the cavity is allowed to equal the pressure outside the cavity during heating, that is, the stress produced by the expanding trapped gases is allowed to be relieved by a permanent strain in the top electrode layer. Therefore, using the ideal gas law, $$V_2 = \frac{T_2}{T_1} \frac{P_1 V_1}{P_2}, \text{ and} \quad \text{Equation 8}$$

at $T_2 = 1000°$ C., $V_2$ is equal to $3.47 V_1$. Further the final volume $v_2$ is then given by:

$$V_2 = V_1 + \Delta V, \quad \text{Equation 9}$$

where $\Delta V$ is the change in the volume given by Equation 2 above, and $V_1$ is the initial volume given by $\pi a^2 h_2$, with $h_2$ equal to the cavity depth. Simultaneously solving these two equations we find a relation between $h_1$, the top electrode 13 layer height, and $h_2$, the cavity depth, which is $h_1 = 4.94 h_2$, assuming $h_2 << a$.

If the cavity is now cooled to room temperature and assuming that the volume remains constant, the pressure inside the cavity becomes 0.23 Atm. Consequently, the static loading of the membrane is 0.77 Atm directed downward. This calculation assumes that the plastically deforming membrane (i.e., top electrode) layer can not resist the stress placed on it by the expanding gases. In reality the flow stress of silicon will not be zero and therefore this calculation gives a worst case scenario If the critical load for the top electrode to collapse is less than 0.77 Atm, the switch will be closed under atmospheric pressure.

Figure 4:
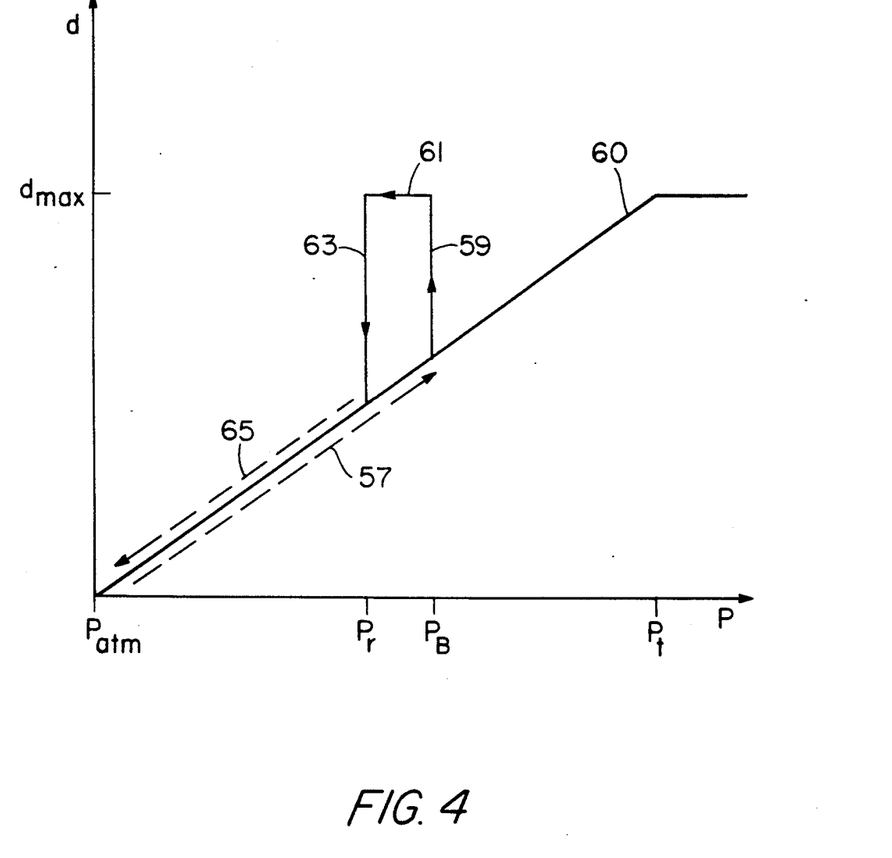
FIG. 4 is a graphic illustration of the mechanical hysteresis behavior of the present invention pressure switch.

Having disclosed design considerations of top electrode height $h_1$, cavity depth $h_2$ and top electrode radius a, the mechanical hysteresis operation of the present invention switch 11 is discussed next. Generally switch 11 exhibits mechanical hysteresis by closing upon advocation of a threshold load (critical pressure $P_B$) and subsequently opening at a lesser load (release pressure $P_r$) as shown in FIG. 4. At applied loads less than the release pressure $P_r$, the switch 11 exhibits deflection as a monotonic function of applied load P.

The FIG. 4 graph of top electrode deflection with respect to pressure is illustrative, where one axis labeled P indicates applied pressure, and the orthogonal axis labeled d indicates deflection of top electrode 13 under the applied pressure. At an initial pressure, say for example atmospheric pressure $P_{atm}$, top electrode 13 is undeflected and hence switch 11 is open. With increasing applied pressure from $P_{atm}$ through $P_B$, deflection of top electrode 13 increases monotonically as shown by dashed line 57.

At the threshold pressure for collapsing $P_B$, top electrode 13 maximally deflects, (i.e., collapses to contact bottom electrode 15), such that switch 11 is closed. This collapsing at $P_B$ is a nonlinear change in deflection, or a discontinuity (singularity) in the pressure-deflection behavior as shown by line 59 in FIG. 4. As the applied load is subsequently decreased from $P_B$ to release pressure $P_r$, top electrode 13 remains collapsed (i.e., at maximal deflection $d_{max}$ as shown by line 61 in FIG. 4), and hence switch 11 remains closed.

At $P_r$ there is a second discontinuity in the pressure-deflection behavior of switch 11; namely, top electrode 13 changes from maximally deflected to an intermediate level of deflection as shown by line 63. Thereafter as applied pressure decreases, deflection of top electrode 13 also decreases as shown by dashed line 65.

For comparison, a pressure switch device exhibiting non-mechanical hysteresis behavior is illustrated by solid line 60 in FIG. 4. Such a device exhibits deflection-pressure behavior to a maximal deflection for applied loads up to a threshold pressure $P_t$. At $P_t$ and greater applied pressure, that device remains at maximal deflection. At subsequent applied pressures decreasing below $P_t$ the device exhibits the deflection-pressure behavior previously exhibited at those pressures. Thus there are no discontinuities in deflection-pressure behavior as in the present invention switch 11.

FABRICATION PROCESS

Figure 3A:
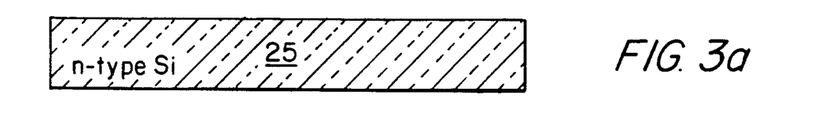
FIGS. 3a-3q illustrate the fabrication process of the present invention pressure switch.

The present invention process for fabricating threshold pressure switch 11 is now described with reference to FIGS. 3a–3q. The fabrication sequence of the preferred embodiment of switch 11 begins with a n-type <100> 0.5–2.0 ohm-cm 4-inch silicon wafer 25 illustrated in FIG. 3a. This wafer ultimately serves as the bottom electrode 15 and hence is referred to as the bottom electrode wafer 25. The wafer is placed in a phosphorus diffusion furnace at 925° C. for 1.5 hours in order to highly dope the surfaces of the wafer. A phosphorous doped $SiO_2$ glass layer is formed in order to highly dope surfaces of the wafer. This doping step is done to ensure that the bottom electrode 15 is a good conductor.

Figure 3B:
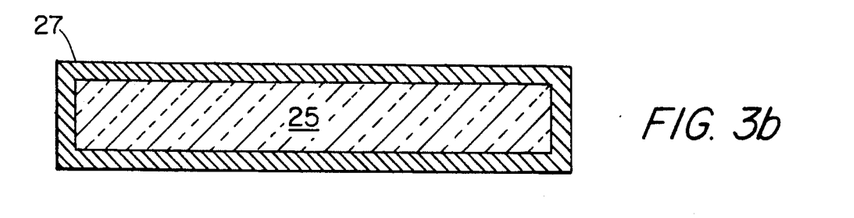

After a one hour drive-in diffusion at 950° C., the wafer is placed in a hydrofluoric acid based etchant to remove the phosphorous-doped $SiO_2$ glass, and a 1000 Å thick silicon oxide layer 27 is thermally grown on wafer 25 as shown in FIG. 3b. Oxide layer 27 serves as a mask and as such is patterned using photolithographic techniques illustrated in FIG. 3c. After the masking oxide layer 27 is patterned, the wafer 25 is placed in 20% KOH at 56° C. to etch circular recessed electrodes 29 about 1 to 8 μm deep and about 0.1 to 0.5 mm in radius, in wafer 25 as shown in FIG. 3d. The etch rate of KOH at 56° C., 20% concentration is approximately 0.3 μm/min. Other wet anisotropic etchants of the dimensioned electrodes may be used in addition to or in preference over KOH. Further, a dry etchant such as plasma may be used to form the cavity.

Figure 3C:
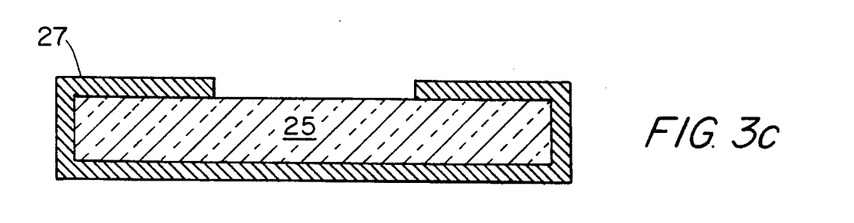
Figure 3D:
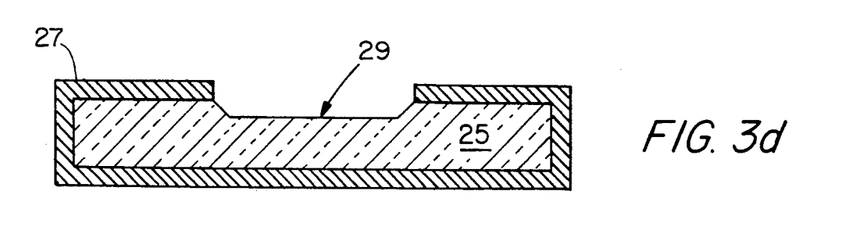
Figure 3E:
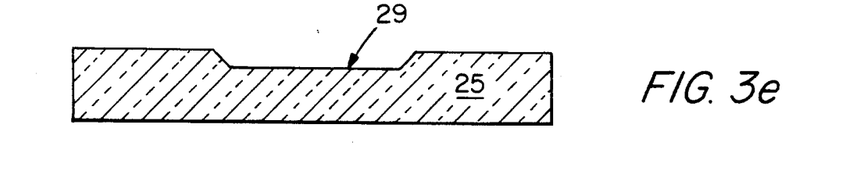
Figure 3F:
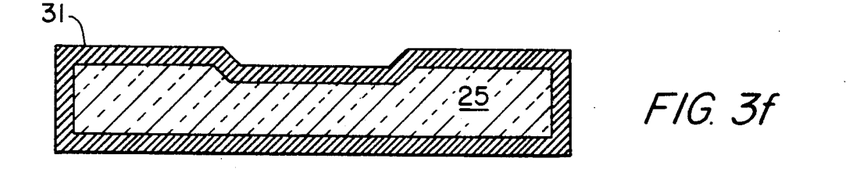
Figure 3G:
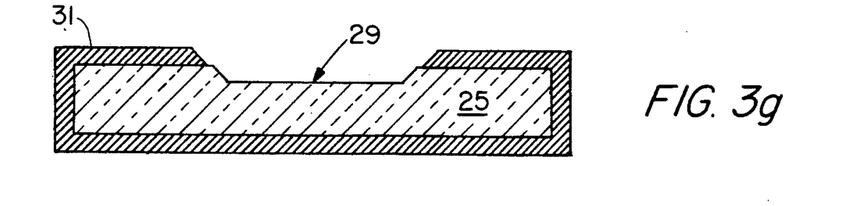

During the patterning and etching steps of FIGS. 3c and 3d, the oxide layer 27 becomes damaged. Thus, the masking oxide layer 27 is removed by a wet hydrofluoric acid etch shown in FIG. 3e. A new thermal oxide layer 31 is grown on wafer 25 to replace masking oxide layer 27 as shown in FIG. 3f. This thick layer 31 of silicon dioxide is sufficiently thick (about 1.0 μm to about 2.0 μm) to act as an insulator between the field regions of the switch electrodes 13, 15. The thermal oxide layer 31 is then patterned by photolithographic techniques to remove the oxide from the recessed electrode areas 29 and thereby expose silicon wafer 25 as shown in FIG. 3g. It is important that the insulating oxide layer 31 is patterned using a mask having a slightly larger radius than the electrode area 29. This is because the oxide grown over a cavity has a slightly enhanced oxidation right at the cavity corner causing an elevated ridge around the cavity edge. This ridge prevents good bonding at the cavity edge and is therefore undesirable.

Figures 3H, 3I:
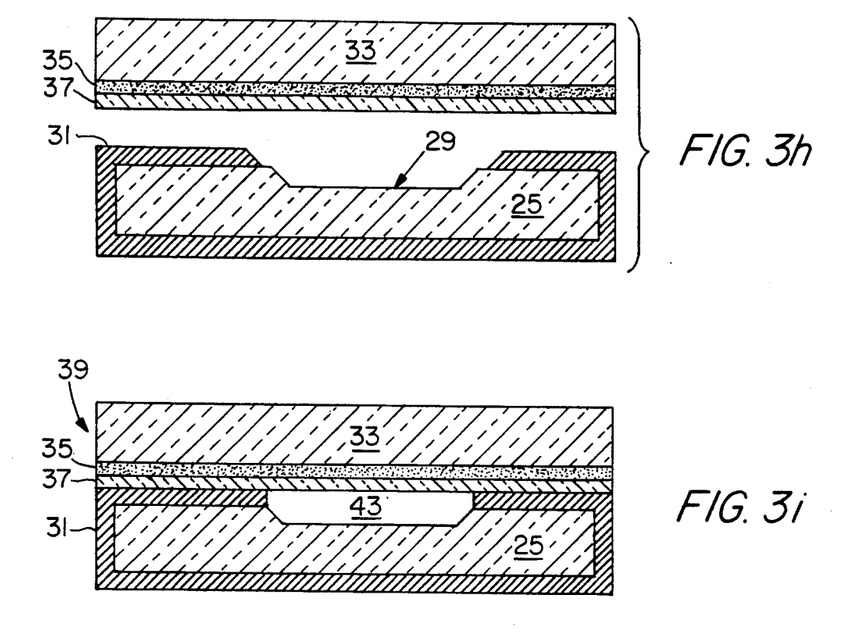

Next, a wafer 33 which ultimately serves as the membrane or top electrode 13 layer is prepared. This includes heavily boron doping a 4 inch <100> p-type 10–20 ohm-cm wafer 33 so as to create a p++ layer 35 on the front side of wafer 33 as shown in FIG. 3h. This p++ layer 35 serves as an anisotropic etch stop in a later described wafer thinning step. A second n-type layer 37 is deposited on top of the p++ layer 35. This second layer 37 is a deposited epitaxial film and preferably about 5 microns thick for the cavity radii and cavity depths desired.

The two wafers 25, 33 are cleaned using a standard pre-oxidation clean, and then hydrated by immersion into a 3:1, sulfuric acid:hydrogen peroxide solution. After a spin rinse and dry, the polished surfaces (oxide layer 31 and second layer 37) of the wafers 25, 33 are physically placed into intimate contact. Such intimate contact and bonding is made possible by the mirror smoothness of the polished sides of the wafers 25, 33, and by the high concentration of OH groups on the wafer surfaces from the hydration step. That is, the mirror smoothness of the wafer surfaces allows good (a uniform) contact to be made between the two wafer surfaces. And the OH groups on the two wafer surfaces have an attraction for each other, such that upon contact of the two surfaces a hydrophilic reaction takes place between the two wafers 25, 33.

The composite two-wafer structure 39 is placed into a dry oxidation furnace at 600° C. in pure nitrogen. The furnace temperature is ramped to 1000° C., at this point the nitrogen is turned off and oxygen is turned on. The wafer structure 39 is kept in the furnace for one hour at 1000° C. in dry $O_2$ to complete the bond. Preferably at the end of the oxidation in the furnace, the temperature is gradually decreased from 1,000° C. to about 600° C. before removing the two-wafer structure 39. This is to ensure that no large temperature gradient exists between the oxide and the furnace ambient that may result in large thermal stresses in the wafers 25, 33. After the oxidation step, the two-wafer structure 39 is completely bonded. Upon removal from the furnace, the bonded wafers are as illustrated in FIG. 3i.

The foregoing step creates the cavity 43 between the bottom electrode wafer 25 and second wafer 33. Also at this time, residual gases are trapped in cavity 43.

Figure 3J:
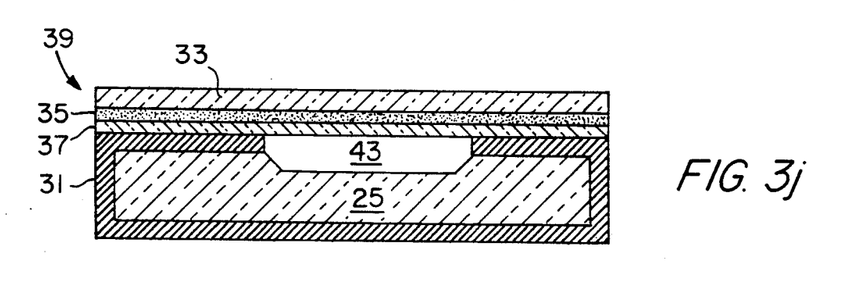
Figure 3K:
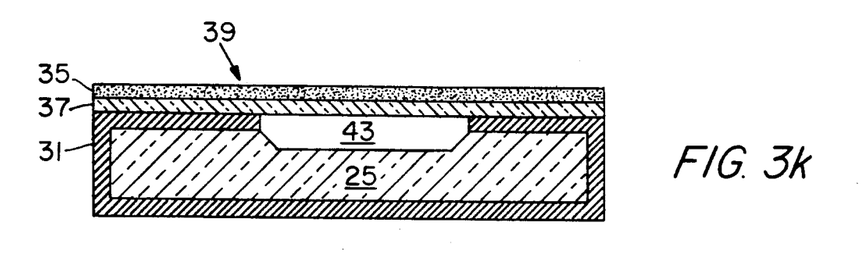

The bonded wafers 39 are then placed in a 20% KOH anisotropic etchant solution at 56° C. for approximately 24 hours. This results in the second wafer 33 being etched back or prethinned to a thickness of about 30 μm as shown in FIG. 3j. The bonded wafers 39 are then placed into a solution of CsOH, also a silicon anisotropic etchant but having better etchstop characteristics on p++ silicon than KOH. Thus, prethinning of wafer 33 from the backside is accomplished in KOH as described above in FIG. 3j, while removal up to the etch stop (p++ layer 35) is accomplished in CsOH. Preferably, etching to the p++ layer 35 is carried out in 60° C., 60% CsOH which has an etch rate of 8 microns per hour. When the p++ layer 35 is exposed to the solution, etching is significantly reduced and able to be observed visually by the absence of bubbles. Once bubbling has ceased, indicating that the p++ layer 35 is exposed and the etch with CsOH is affectively ended, the bonded wafers 39 are removed as shown in FIG. 3k.

Figure 3L:
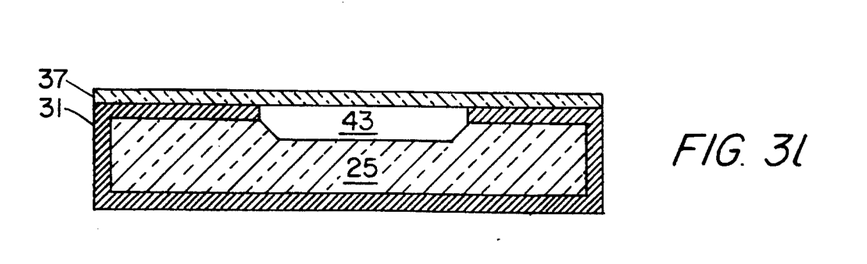

Next a suitable chemical formula is employed to selectively remove the p++ layer 35. Specifically, the bonded wafers 39 are immersed in a mixture 8:3:1 acetic acid: nitric acid: hydrofluoric acid which has a calculatable etching time. After the bonded wafers 39 are immersed into this solution, the solution turns brown indicating the presence of $HNO_2$. At the end of the calculated etching time, the bonded wafers 39 are removed from the etchant and typically bear brown stains. The brown stains indicate the presence of porous silicon in the lightly doped regions. To remove the brown stains, (i.e, porous silicon), the bonded wafers 39 are immersed in a mixture of 97:3 nitric acid: hydrofluoric acid for approximately 15 seconds. Upon removal from this mixture, what remains is the second layer 37 on the oxide layer 31 supported by wafer 25 as shown in FIG. 3l. The resultant thickness of the second layer 37 is dependent on the thickness of the epitaxial n-type silicon layer and is preferably about 5 μm. It is this silicon layer 37 which serves as top electrode 13 as made clear by the following.

Figure 3M:
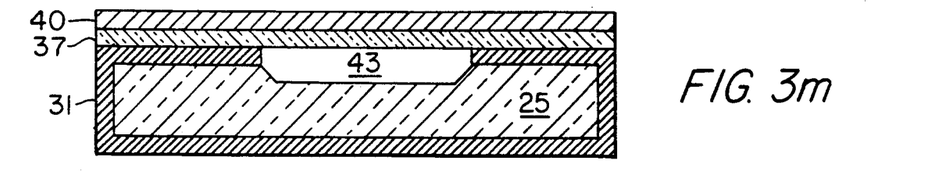
Figure 3N:
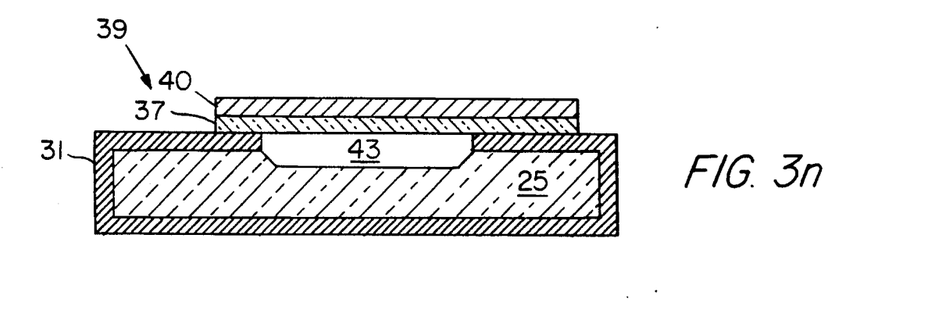

Following an RCA cleaning, a 5000 Å thick low-temperature masking oxide (LTO) 40, is deposited onto the just etched surface as shown in FIG. 3m. The LTO layer 40 is then patterned using a resist mask, and the layer 40 is etched using either a wet etchant, such as buffered oxide etch, or a dry etchant, such as plasma, to expose the thin silicon second layer 37. The thin silicon layer 37 is then etched using a dry etchant, such as plasma, or using a wet chemical etch, such as KOH, to form the shape of the top electrode 13 as shown in FIG. 3n. Masking oxide layer 40 is then removed by a hydrofluoric acid etchant or a buffered oxide etchant.

The foregoing is carried out in temperatures well below the onset of plastic deformation of silicon and preferably at about 400° C. Such low temperature processing is enabled by the use of the low temperature oxide masking layer 40. In addition, this layer 40 is deposited at a thickness much less than the thickness of the thin silicon layer 37 to expedite the patterning and etching of the masking oxide layer 40.

Figure 3O:
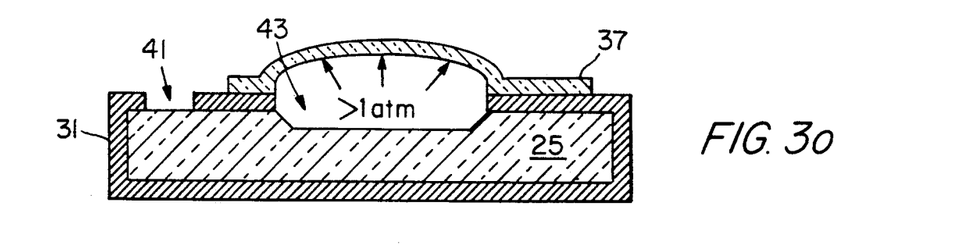

Next a masking and wet oxide step selectively removes oxide 31 from the surface of bottom electrode wafer 15 so as to form contact vias 41 shown in FIG. 3o. Common photolithographic techniques are used. The photoresist is removed in the asher. The wafer structure 39 is then placed into a high temperature furnace (above about 600° C.) to plastically deform the top electrode layer 37 as shown in FIG. 3o. The extent of the deformation is strongly dependent on the cavity depth etched into bottom electrode wafer 15, the thickness of the capping thin silicon layer 37 and temperature.

In the preferred embodiment, the wafer structure 39 is left in a furnace at a temperature above about 850° C. for about one hour. Temperatures between about 850° C. and 1100° C. are preferred. During this time, the trapped residual gas in cavity 43 expands causing swelling of the cavity walls, (i.e., thin silicon layer 37). In turn, the swelling generates a pressure directed radially outward from the cavity 43 and which is greater than 1 atm at the high furnace temperature. As a result, the thin silicon layer 37 yields and plastically deforms. The thin silicon layer 37 being less than 5 microns thick ensures that the generated internal pressure exceeds the yield stress of silicon.

Figure 3P:
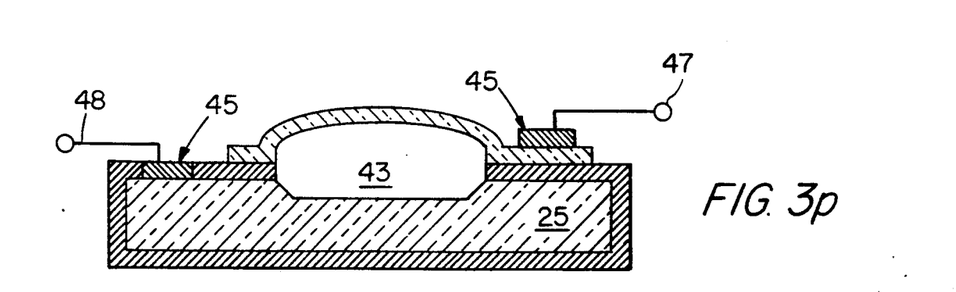
Figure 3Q:
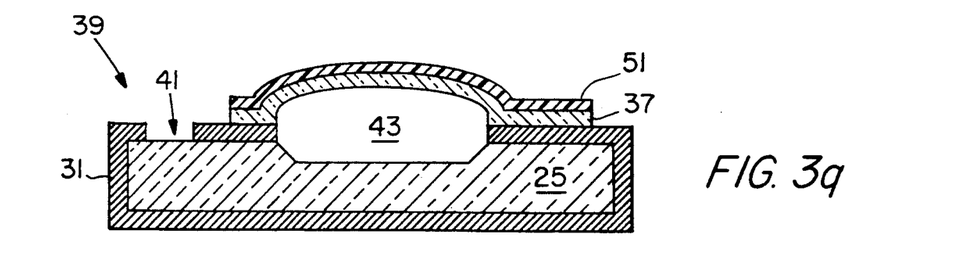

Alternatively, the wafer structure 39 is placed in a high temperature environment (e.g., a furnace) to bloat but not plastically deform the top electrode layer 37 as shown in FIG. 3q. Since silicon plastically deforms above about 600° C., this operation is preferably carried out at a lower temperature. The heat causes the trapped gases to expand as described before, and this induces the top electrode layer 37, which is a capping layer over the cavity, to deflect outward, i.e., bloat. Some suitable layer 51, such as LTO is then deposited onto this bloated layer 37 to lock the shape into place, i.e., cause a permanent set. Upon removal of the bloated wafer structure 39 from the furnace, the cavity capping top electrode layer 37 retains its permanent set. The shape setting (LTO) layer 51 is deposited and patterned by common techniques, such that the contact vias 41 remain accessible. Shape setting layer 51 has physical characteristics (i.e., dimensions and mechanical properties) which allow top electrode layer 37 to respond to applied loads as described in FIGS. 1a-2 and 4.

Subsequent to high temperature exposure in either case of FIG. 3o and 3q, a thin layer of aluminum is e-beam evaporated, sputtered or otherwise deposited onto the upper surface of the wafer structure 39. The deposited aluminum layer 45 is then patterned in contact vias 41 formed on the wafer structure surface in FIG. 3o. Following this step, the aluminum layer 45 is wet etched to form the contacts 47, 48 of the pressure switch as shown in FIG. 3p. Preferably the patterning and etching are accomplished by photolithoghraphy techniques and etchants comprising phosphoric acid, acetic acid, nitric acid, and water preferably with relative concentrations of 16:2:2:1. The aluminum layer 45 is then sintered in nitrogen at about 375° C. for 30 minutes to form Al-Si alloy for the contacts. The individual pressure switches formed many to one wafer are separated by common techniques and packaged.

POTENTIAL APPLICATIONS

Potential applications for a threshold pressure switch of the present invention are now described. Much of the attractiveness of the invention switch stems from its low per-unit cost of manufacturing which is due to the switch being batch fabricated, similar to the low per-unit cost of integrated circuits. Additionally, the threshold pressure at which the switch closes is easily tailorable to specific applications and can be tightly controlled. This is du to the switch design and to the preciseness of integrated circuit fabrication techniques. The critical dimensions for the switch are cavity depth, the radius of the cavity and the thickness of the top electrode layer. Each of these dimensions can be very accurately controlled either by the use of etchstop techniques or standard photolithography technology.

A first application relates to an active sensor for indicating tire pressure of an automobile and the like. By mounting a chip with an appropriately dimensioned threshold pressure sensor on it inside the tire of a vehicle, the tire pressure can be continuously monitored. Ideally the invention switch would be connected to a light on the dashboard. If the tire pressure is adequate, say above 34 psi, the switch is closed and the light goes off, however if the tire pressure falls below a certain level, the switch opens and the dashboard light illuminates indicating to the driver that air is required for proper inflation. Due to the mechanical hysteresis inherent in the invention switch structure, the pressure at which the switch would open will be below the 34 psi required to close the switch electrodes. In this way, the light on the dashboard would not illuminate until the tire pressure fell significantly and therefore would not be an annoyance to the vehicle operator. The cost of manufacture and installment would be low and reliability very good for this switch, making it well suited to this application.

Another potential application for the threshold pressure switch of the present invention is in air and gas compressors. Currently, air and gas electromechanical compressors utilize a pressure sensing switch inside the storage tank to monitor the tank pressure. The compressor motor continues to operate, compressing the air or gas and storing it in the tank until the threshold pressure of the switch is reached. At this point the switch changes state and the compressor motor is turned off thereby saving energy and motor wear. As the tank pressure drops due to use and leaks, the pressure switch will change states once again after the tank pressure drops to some set point. The changing of the switch signals the compressor motor to start thereby bringing the tank pressure back up.

Another application relates to using the invention threshold pressure switch in a keyboard i.e., as pressure switches for each key of the keyboard. As a person types and applies pressure to the keys, the switches are closed and opened after removal of pressure. Again the threshold pressure can be tailored to this application and the resulting cost quite low.

Another application is to use the invention threshold pressure switch as a scale (weight detection mechanism) whereby if a sufficiently heavy object is placed onto the switch it will close, otherwise it stays open. Since the size of the switches is small, a number of switches may be used in order to distribute them properly under the test object. This type of scale could prove useful where sorting of objects is done depending on their weight. For example, if a postal service wished to sort boxes depending on their weight, then a conveyer belt would move each box over an array of threshold pressure switches of the present invention. If the box was sufficiently heavy, as indicated by the switches, it would be moved (via conveyer belt) in a certain direction. However, if the box was not heavy enough to close the switches, then it would be moved in another direction. The attractiveness of such a set up is the simplicity and low cost of the threshold pressure switches configured for this application.

By fabricating an array of these pressure switches over a surface of a wafer, a tactile sensor array for robotic applications can be made. Ideally, the compliance of the wafer should be increased to aid in conforming the tactile sensor array to various structures. This is easily achieved by etching away the appropriate amount of silicon to thin the wafer and increase its flexibility.

By venting the sealed cavity of the invention switch, to atmospheric pressure, a mechanical memory element can be realized and would determine the proximity of various rigid bodies. Such venting is easily accomplished by etching channels through the backside of the bottom electrode wafer to the cavity. An array of such vented switches would then be assembled together, each switch having a different top electrode radius and hence different threshold buckling pressure. Further each switch would be open until it was placed in an environment of interest which caused the switch to close. Once closed, a switch remains closed until application of a negative pressure. Thus, after removing the array of switches from a subject environment, closed switches would be inspected to determine the closeness of various objects in the subject environment. To reset the closed switches for further application of the mechanical memory element (i.e., array of switches), a negative pressure is applied accordingly.

It is understood that other applications (e.g., a vacuum switch) are suitable and within the purview of one skilled in the art.

EQUIVALENTS

While the invention has been particularly shown and described with reference to a preferred embodiment thereof, it will be understood by those skilled in the art that various changes in form and details may be made therein without departing from the spirit and scope of the invention as defined by the appended claims. For example, it is understood that other materials beside silicon are suitable. The foregoing description and discussion involving silicon are for purposes of illustration and not limitation.

We claim:

1. A method of fabricating a pressure switch of the type having a first electrode spaced from a second electrode, the first electrode being moved toward and contacting the second electrode upon application of a threshold pressure to the switch, the method comprising the steps of:

forming the first electrode spaced from the second electrode by (a) trapping gas in an enclosed cavity formed between a first working layer and a second working layer, and (b) expanding the gas to generate pressure sufficient to bloat radially outward from the cavity at least the first working layer, such that the first working layer is substantially hemispherically dome shaped by the gas, the gas bloated and substantially hemispherically dome shaped first working layer forming the first electrode and the second working layer across the cavity forming the second electrode.

2. A method of fabricating a pressure switch having an upper electrode and a lower electrode spaced from the upper electrode, comprising the steps of:

providing a first silicon wafer having an upper surface;

forming a cavity in the first silicon layer through the upper surface such that the cavity has an opening at the upper surface;

attaching a second silicon layer to the upper surface of the first silicon layer such that a portion of the second silicon layer covers the cavity opening and traps gas in the cavity;

expanding the gas trapped in the cavity to generate pressure sufficient to bloat the portion of the second silicon layer covering the cavity opening, the bloated portion of the second silicon layer being the upper electrode and the first silicon layer being the lower electrode to form a pressure switch, the pressure switch changing from an open state to a closed state when a pressure sufficient to collapse the upper electrode to the lower electrode is applied to the switch; and providing readout means coupled to the upper and lower electrodes, the readout means for indicating state of the pressure switch.

3. A method as claimed in claim 2 wherein the step of attaching the second silicon layer to the upper surface of the first silicon layer includes a silicon wafer bonding the second silicon layer to the first silicon layer.

4. A method as claimed in claim 2 wherein the step of expanding the gas trapped in the cavity includes heating the gas above a temperature at which the second silicon wafer plastically deforms.

5. A method as claimed in claim 2 wherein the step of expanding the gas includes bloating the portion of the second silicon layer until that portion plastically deforms.

6. A method of claim 2 further comprising the steps of:

covering the bloated portion of the second silicon layer with a layer for maintaining shape of the bloated portion for an initial open state of the pressure switch.

7. A pressure switch of the type having a first electrode spaced from a second electrode, the first electrode being moved toward and contacting the second electrode upon application of a threshold pressure to the switch, the switch being formed by the steps of:

providing a first working layer having an upper surface and a cavity formed therethrough such that the cavity has an opening at the upper surface;

securing a second working layer to the upper surface of the first working layer in a manner that covers the cavity opening to enclose the cavity and traps gas in the cavity, said securing being of a strength sufficient to hold the first and second working layers together during plastic deformation of one of the layers; and plastically deforming a portion of the second working layer that forms a wall of the enclosed cavity by at least expanding the gas trapped in the cavity, said expanding being in a manner that generates pressure directed radially outward from the cavity and sufficient to plastically deform the portion of the second working layer that forms a wall of the cavity, the plastically deformed portion being the first electrode and a portion of the first working layer spaced across the cavity from the plastically deformed portion of the second working layer being the second electrode to form a pressure switch.

8. A pressure switch as claimed in claim 7 wherein the second working layer comprises single crystal silicon.

9. A pressure switch as claimed in claim 7 wherein the step of plastically deforming the portion of the second working layer by expanding the trapped gas includes heating the gas above a temperature at which the second working layer plastically deforms.

10. A pressure switch as claimed in claim 7 wherein the plastically deformed portion exhibits mechanical hysteresis by (a) collapsing from initial position to contact the second working layer in response to application of a first threshold pressure, and (b) subsequently returning to initial position in response to a substantial decrease of applied pressure to a second threshold pressure, the plastically deformed portion remaining collapsed for applied pressures between the first and second threshold pressures.

11. A pressure switch of the type having a first electrode spaced from a second electrode, the first electrode being moved toward and contacting the second electrode upon application of a threshold pressure to the switch, the improvement comprising:

forming the first electrode spaced from the second electrode by (a) trapping gas in an enclosed cavity formed between a first working layer and a second working layer, wherein the first working layer is single crystal silicon, and (b) expanding the gas to generate pressure sufficient to bloat radially outward from the cavity at least the first working layer, the bloated first working layer forming the first electrode and the second working layer across the cavity forming the second electrode.

12. A pressure switch of the type having a first electrode spaced from a second electrode, the first electrode being moved toward and contacting the second electrode upon application of a threshold pressure to the switch, the improvement comprising:

forming the first electrode spaced from the second electrode by (a) trapping gas in an enclosed cavity formed between a first working layer and a second working layer, said trapping gas in the cavity including:

providing a first silicon layer having an upper surface;

forming a cavity in the first silicon layer through the upper surface such that the cavity has an opening at the upper surface; and silicon wafer bonding a second silicon layer to the upper surface of the first silicon layer such that a portion of the second silicon layer covers the cavity opening and traps gas in the cavity, the cavity being enclosed between the first silicon layer and the second silicon layer, and (b) expanding the gas to generate pressure sufficient to bloat radially outward from the cavity at least the working layer, the bloated first working layer forming the first electrode and the second working layer across the cavity forming the second electrode.

13. A pressure switch of the type having a first electrode spaced from a second electrode, the first electrode being moved toward and contacting the second electrode upon application of a threshold pressure to the switch, the improvement comprising:

forming the first electrode spaced from the second electrode by (a) trapping gas in an enclosed cavity formed between a first working layer and a second working layer, and (b) expanding the gas to generate pressure sufficient to bloat radially outward from the cavity at least the first working layer, the bloated first working layer forming the first electrode and the second working layer across the cavity forming the second electrode, said expanding the gas including heating the gas above a temperature at which the first working layer plastically deforms.

14. A pressure switch of the type having a first electrode spaced from a second electrode, the first electrode being moved toward and contacting the second electrode upon application of a threshold pressure to the switch, the improvement comprising:

forming the first electrode spaced from the second electrode by (a) trapping gas in an enclosed cavity formed between a first working layer and a second working layer, and (b) expanding the gas to generate pressure sufficient to bloat radially outward from the cavity at least the first working layer, the bloated first working layer forming the first electrode and the second working layer across the cavity forming the second electrode, said expanding the gas including bloating the first working layer in a manner such that the first working layer plastically deforms.

15. A pressure switch of the type having a first electrode spaced from a second electrode, the first electrode being moved toward and contacting the second electrode upon application of a threshold pressure to the switch, the improvement comprising:

forming the first electrode spaced from the second electrode by (a) trapping gas in an enclosed cavity formed between a first working layer and a second working layer, (b) expanding the gas to generate pressure sufficient to bloat radially outward from the cavity at least the first working layer, the bloated first working layer forming the first electrode and the second working layer across the cavity forming the second electrode, and (c) covering the bloated first working layer with a layer for maintaining shape of the bloated first working layer such that the first working layer remains bloated until application of a threshold pressure to the switch.

16. A pressure switch of the type having a first electrode spaced from a second electrode, the first electrode being moved toward and contacting the second electrode upon application of a threshold pressure to the switch, the improvement comprising:

forming the first electrode spaced from the second electrode by (a) trapping gas in an enclosed cavity formed between a first working layer and a second working layer, and (b) expanding the gas to generate pressure sufficient to bloat radially outward from the cavity at least the first working layer, the bloated first working layer forming the first electrode and the second working layer across the cavity forming the second electrode, and the bloated first working layer exhibiting mechanical hysteresis by (a) collapsing from an initial bloated shape to contact the second working layer in response to application of a first threshold pressure, and (b) subsequently returning to the initial bloated shape in response to a decrease of applied pressure to the second threshold pressure, the first working layer remaining collapsed for applied pressures between the first and second threshold pressures.

* * * * *

UNITED STATES PATENT AND TRADEMARK OFFICE
CERTIFICATE OF CORRECTION

PATENT NO. : 5,164,558

DATED : November 17, 1992

INVENTOR(S) : Michael A. Huff and Martin A. Schmidt

It is certified that error appears in the above-identified patent and that said Letters Patent is hereby corrected as shown below:

Column 13, line 38 before "to" insert -- spaced across the cavity from the upper electrode---.

Column 15, line 12 before the first occurrence of "working" insert ---first---.

Column 16, line 43 after "to" and before "second" delete "the" and insert therefor ---a---.

Signed and Sealed this

Thirty-first Day of May, 1994

Attest:

BRUCE LEHMAN

Attesting Officer     Commissioner of Patents and Trademarks